United States Patent
Watanabe et al.

(10) Patent No.: US 8,365,223 B2
(45) Date of Patent: Jan. 29, 2013

(54) DEVICE CONTROL PROCESSING APPARATUS AND METHOD, DISPLAY PROCESSING APPARATUS AND METHOD, AND COMPUTER PROGRAM

(75) Inventors: Osamu Watanabe, Tokyo (JP); Tetsugo Inada, Tokyo (JP); Hideshi Yamada, Tokyo (JP); Yasuhiro Moriyama, Tokyo (JP)

(73) Assignee: Sony Corporation, Tokyo (JP)

( * ) Notice: Subject to any disclaimer, the term of this patent is extended or adjusted under 35 U.S.C. 154(b) by 43 days.

(21) Appl. No.: 12/883,847

(22) Filed: Sep. 16, 2010

(65) Prior Publication Data

US 2011/0072464 A1    Mar. 24, 2011

Related U.S. Application Data

(63) Continuation of application No. 10/550,195, filed as application No. PCT/JP2004/006613 on May 11, 2004.

(30) Foreign Application Priority Data

May 28, 2003   (JP) ............................... P2003-150589

(51) Int. Cl.
  G06F 3/00       (2006.01)
  G06F 13/00      (2006.01)
  G06F 3/048      (2006.01)
  H04N 5/445      (2006.01)
(52) U.S. Cl. ............. 725/45; 725/52; 715/716; 715/764
(58) Field of Classification Search ............... 725/80
  See application file for complete search history.

(56) References Cited

U.S. PATENT DOCUMENTS

| 5,684,525 | A | 11/1997 | Klosterman |
| 5,883,677 | A | 3/1999 | Hofmann |
| 6,219,839 | B1 | 4/2001 | Sampsell |
| 6,281,940 | B1 * | 8/2001 | Sciammarella ............... 348/564 |
| 6,305,018 | B1 | 10/2001 | Usui et al. |
| 6,401,059 | B1 | 6/2002 | Shen et al. |
| 6,408,435 | B1 | 6/2002 | Sato |
| 6,425,129 | B1 * | 7/2002 | Sciammarella et al. ......... 725/38 |
| 6,857,128 | B1 * | 2/2005 | Borden et al. .................. 725/39 |

(Continued)

FOREIGN PATENT DOCUMENTS

| JP | 08-275077 | 10/1996 |
| JP | 08-289278 | 11/1996 |

(Continued)

OTHER PUBLICATIONS

Japanese Office Action dated Dec. 18, 2008, for corresponding Japanese Patent Application No. 2003-150589.

(Continued)

*Primary Examiner* — Bennett Ingvoldstad
(74) *Attorney, Agent, or Firm* — K&L Gates LLP

(57) ABSTRACT

An apparatus and method capable of selecting and providing content while reducing the load on a user are provided. A controlled device is determined based on content identification information. Control information corresponding to the determined controlled device is generated and output to, for example, a remote controller, and device control is performed based on a control signal from the remote controller. The user can output and view content without performing processing necessary to output the content, such as processing on a control device, a channel operation to the control device, and searching for the content storage location. Further, content cards recording content information are displayed as a card group and content information of a card at a position of a cursor is displayed.

8 Claims, 18 Drawing Sheets

U.S. PATENT DOCUMENTS

| | | | |
|---|---|---|---|
| 7,590,995 B2 * | 9/2009 | Nakamura et al. | 725/52 |
| 2002/0033848 A1 * | 3/2002 | Sciammarella et al. | 345/838 |
| 2002/0054157 A1 | 5/2002 | Hayashi et al. | |
| 2002/0194299 A1 | 12/2002 | Yasaki et al. | |
| 2003/0046693 A1 | 3/2003 | Billmaier | |

FOREIGN PATENT DOCUMENTS

| | | |
|---|---|---|
| JP | 08-314979 | 11/1996 |
| JP | 10-093880 | 4/1997 |
| JP | 09-138745 | 5/1997 |
| JP | 10-093880 | 4/1998 |
| JP | 11-027761 | 1/1999 |
| JP | 11-065806 | 3/1999 |
| JP | 11-098431 | 4/1999 |
| JP | 11-168471 | 6/1999 |
| JP | 11-313291 | 11/1999 |
| JP | 2000-175140 | 6/2000 |
| JP | 2000-287179 | 10/2000 |
| JP | 2001-148815 | 5/2001 |
| WO | 00/33572 | 6/2000 |
| WO | 02/071743 | 9/2002 |
| WO | WO 02/071743 * | 9/2002 |
| WO | 03021948 | 3/2003 |

OTHER PUBLICATIONS

European Search Report dated Jun. 22, 2009, for corresponding EP Application No. 04732210.2.

* cited by examiner

| ID | CONTENT | DEVICE | LOCATION |
|---|---|---|---|
| 013567 | ABC-TV | TV | CHANNEL 1 |
| 014826 | TOKYO TV | TV | CHANNEL 8 |
| .. | .. | .. | .. |
| 025563 | CS-SO CHANNEL | CS | CHANNEL 153 |
| 027643 | CS-SKY CHANNEL | CS | CHANNEL 208 |
| .. | .. | .. | .. |
| 057843 | NEWS | HDVR | LIST NO. 232 |
| 056293 | DRAMA abc | HDVR | LIST NO. 364 |
| .. | .. | .. | .. |

FIG. 3

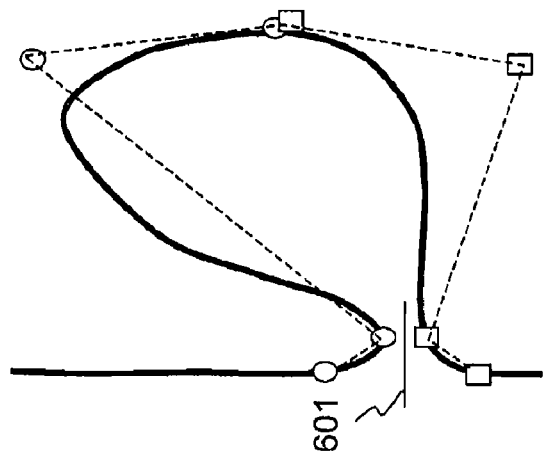
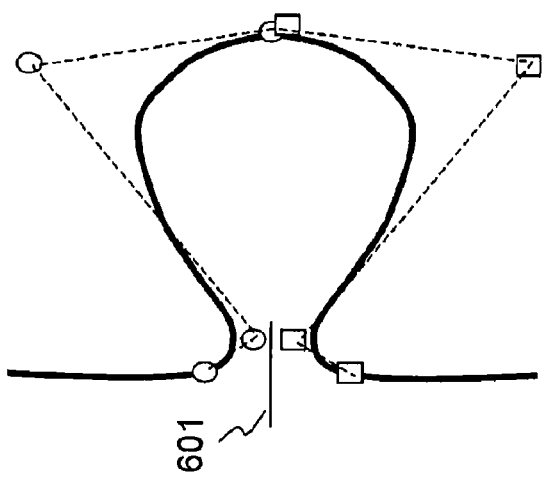
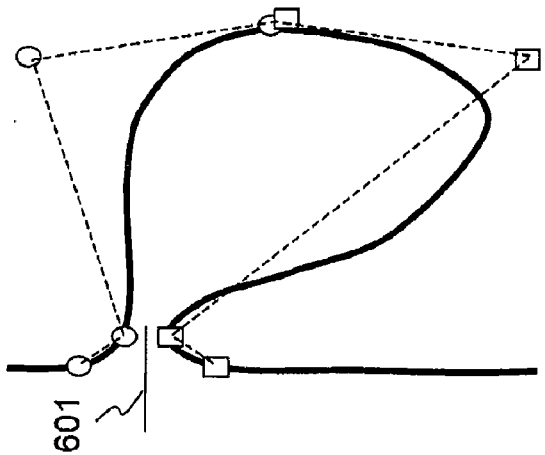
FIG. 10

DEVICE CONTROL PROCESSING APPARATUS AND METHOD, DISPLAY PROCESSING APPARATUS AND METHOD, AND COMPUTER PROGRAM

CROSS REFERENCE TO RELATED APPLICATION

The present application is a continuation of U.S. application Ser. No. 10/550,195 filed on Oct. 5, 2005, which is a National Stage of International Application No. PCT/JP04/006613 filed on May 11, 2004, of which claims priority to Japanese Patent Application No. 2003-150589 filed on May 28, 2003, the entire contents of which are hereby incorporated by reference.

BACKGROUND

The present disclosure relates to a device control processing apparatus and method, a display processing apparatus and method, and a computer program for controlling a television receiver, a display device such as a display, and other various electronic devices to allow a user to efficiently select and output a content item while reducing the load on the user in selecting a content item and controlling the devices.

With the recent prevalence of data communication networks, so-called home networks in which, even at home, home electric devices, computers, and other peripheral devices are connected to a network so that these devices can communicate with one another have become increasingly popular. Home networks allow network-connected devices communicating with one another to share the data processing functions of the devices and allow content to be transmitted and received between the devices, thus providing usability and convenience for users. In the future, home networks will become more prevalent.

For example, ten or so years ago, the only networks connected to the home were terrestrial television broadcasting networks and telephone lines. Digital products, such as personal computers (PCs) and CD players, were not available at home, and an in-home network merely allowed connecting a television to a VTR to record a television program or connecting audio equipment.

Recently, however, "home network (customer network)" systems making use of intranet technology, such as a LAN, which has been developed mainly for business purposes have rapidly attracted attention. Navigation systems (EPG (Electronic Program Guide) systems) having a program guide function, called EPG, for providing information to users and guiding user operations, have been developed by broadcasting companies, such as CS broadcasting companies and CATV companies, and have been available to users.

For example, Japanese Unexamined Patent Application Publication No. 11-313291 (Patent Document 1) discloses a structure that allows selection of television programs (content) using program guide information provided by an EPG system without resorting to external information from a television program schedule in the newspaper, a television guide magazine, etc.

Recently, there also has been put into practice a structure that allows a user to access electronic devices in a house even from outside the house via a portable terminal using a home network and an external network, such as the Internet, to perform services. For example, Japanese Unexamined Patent Application Publication No. 11-168471 (Patent Document 2) discloses a system for controlling various devices, such as a home air conditioner, using a terminal having a wireless communication function.

On the other hand, there have been a wide variety of content services available for users. For example, television broadcasts have been available via various data delivery methods, such as ground waves, CS and BS satellite broadcasting, and cable TVs, and video and music delivery services have also been increasingly available via the Internet or telephone lines. Content has also been increasingly provided via media, such as CDs, DVDs, and MDs.

However, due to the development of information devices and the diversification of content, the load on a user in selecting content by operating devices has increased. For example, a user needs to select one of a plurality of channels to watch TV. The number of CS broadcast channels ranges over 100 or more. A user needs to perform an operation to select a desired program from multiple broadcast programs.

Recent hard disk video recorders or DVD recorders that have become popular have a large data capacity. A large number of broadcast programs recorded by a user are stored in a DVD or an HD, and the number of recordings increases over time. In selecting data (content, programs) from such large-capacity data storage means, the user also needs to perform an operation to select desired data from a large volume of data.

Moreover, in a home network environment in which various information devices are connected, content is stored in not only a PC and a hard disk video recorder but also a home server, and a user needs to select a desired content item from multiple content items available from the multiple network-connected devices.

Therefore, a problem occurs in that the diversification and increase of information devices, media, and content providing services cause users to spend much time and labor in selecting content to be used.

Traditionally, a user needs to distinctly recognize an appropriate device to be operated and to operate the device, e.g., a television for television program application, a DVD player for DVD application, a CD player designed for music application, or a PC, a portable telephone, and a PDA designed for homepage application. For example, when a CS tuner and a hard disk video recorder are connected to or integrated into a television, there are three video content types the user can browse on the television: terrestrial broadcasts, CS channels, and video content stored in the hard disk video recorder.

These three different input content types are individually supported by three devices. Thus, the user needs to operate the CS tuner when he/she desires to view CS channel broadcasts. When the user desires to view the video content stored in the hard disk video recorder, he/she needs to operate the hard disk video recorder and further needs to perform an input switching operation on the television. Even if the channel of the CS tuner is set, the desired channel broadcast cannot be viewed until the input of the television is switched to the CS tuner. As such, multiple devices in the home increases the kinds of devices available for the user although it is necessary to understand the device configuration to enjoy content, which places a heavy load on the user.

Also in selecting one channel to be viewed from a plurality of terrestrial, BS, and CS channels, it takes a long time to search all broadcast programs by, for example, sequentially switching the channels, which places a load on the user.

There is a scroll bar serving as a screen display processor with an improved-efficiency selection operation of display data. The scroll bar allows data, such as motion pictures, still images, and text data, to be displayed on a screen. If all data is not on the screen, only a portion on which the user's attention is focused is visible, and the scroll bar is operated to switch the display to view a hidden portion.

Such a scroll bar mechanism has a problem in that although it is understandable which part of the entire data his/her focused portion displayed on the screen is located in, no information about the hidden elements is obtained.

SUMMARY

The present disclosure has been made in view of the foregoing problems, and provides a structure that allows a user to view content merely by selecting desired content, while reducing the load on the user in selecting content, without bothering the user for content-providing devices and media. In an embodiment, the present disclosure provides a device control processing apparatus and method, a display processing apparatus and method, and a computer program in which a need for a user to select a content-providing device or to select a channel is eliminated to reduce the load on the user.

In another embodiment, the present disclosure provides a device control processing apparatus and method, a display processing apparatus and method, and a computer program that allow a user to efficiently select a content item from multiple viewable content items provided by various devices and media, in which visibility of listed information items is improved and more content information items are presented to the user, thereby achieving increased convenience in selecting content.

According to a first aspect of the present disclosure, there is provided a device control processing apparatus including:

a storage unit that stores a content-device-correspondence table storing correspondence data between content identification information and content-providing devices;

an input unit that inputs content identification information; and data processing means for specifying a controlled device from the content-device-correspondence table based on the content identification information input from the input unit and for generating and outputting control information corresponding to the specified controlled device.

In an embodiment of the device control processing apparatus according to the present disclosure, the device control processing apparatus is connected to a remote controller for remotely operating the controlled device, and the data processing means is configured to output remote-controller control data to the remote controller.

In an embodiment of the device control processing apparatus according to the present disclosure, the content-device-correspondence table is configured to store content-providing device information corresponding to content and channel information or content storage location information indicating content location, and the data processing means is configured to acquire a controlled device and channel information or content storage location information indicating content location from the content-device-correspondence table based on the content identification information input from the input unit, and is configured to generate and output control information necessary for providing the content corresponding to the acquired channel information or content storage location information.

According to a second aspect of the present disclosure, there is provided a display processing apparatus for performing a content information displaying process, including:

display data generating means for performing a process for configuring content cards recording content information according to the number of content items, displaying a card group including a plurality of content cards corresponding to the number of content items as a card group that indicates only the presence of content with the content information being hidden, and displaying a content item selected by a user-operable selection indicator in a portion adjacent to the card group with the content information being displayed.

In an embodiment of the display processing apparatus according to the present disclosure, the display data generating means is configured to perform a process for determining the manner in which each of the content cards is displayed depending on the relative position of the selection indicator in the card group.

In an embodiment of the display processing apparatus according to the present disclosure, the display data generating means is configured to determine the manner in which each of the content cards is displayed depending on the relative position of the selection indicator in the card group, and is configured to perform a display process in which a content card at a position close to the selection indicator is set to an angle at which the content information is displayed and a content card at a position far from the selection indicator is set to an angle at which the content information is hidden.

In an embodiment of the display processing apparatus according to the present disclosure, the display data generating means is configured to perform a process for moving the content cards along a parametric curve and displaying a content item selected by the selection indicator at a position on the parametric curve apart from the card group with the content information being displayed.

In an embodiment of the display processing apparatus according to the present disclosure, the display data generating means is configured to perform a process for classifying and displaying the content cards by genre.

According to a third aspect of the present disclosure, there is provided a content card that records content information, wherein the content card is configured to record content-providing device and location information as code data.

In an embodiment of the content card according to the present disclosure, the code data is a bar code.

In an embodiment of the content card according to the present disclosure, the location information is URL (Uniform Resource Locators) serving as content location information suitable for acquiring content.

According to a fourth aspect of the present disclosure, there is provided a device control processing method including:

a content identification information inputting step of inputting content identification information; and a data processing step of determining a controlled device from a content-device-correspondence table storing correspondence data between content identification information and content-providing devices based on the input content identification information, and generating and outputting control information corresponding to the determined controlled device.

In an embodiment of the device control processing method according to the present disclosure, in the device control processing method, the data processing step generates and outputs remote-controller control data.

In an embodiment of the device control processing method according to the present disclosure, the content-device-correspondence table is configured to store content-providing device information corresponding to content and channel information or content storage location information indicating content location, and the data processing step acquires a controlled device and channel information or content storage location information indicating content location from the content-device-correspondence table based on the content identification information input from the input unit, and generates and outputs control information necessary for providing the content corresponding to the acquired channel information or content storage location information.

According to a fifth aspect of the present disclosure, there is provided a display processing method for performing a content information displaying process, including:

a step of configuring content cards recording content information according to the number of content items and displaying a card group including a plurality of content cards corresponding to the number of content items as a card group that indicates only the presence of content with the content information being hidden; and a step of displaying a content item selected by a user-operable selection indicator in a portion adjacent to the card group with the content information being displayed.

In an embodiment of the display processing method according to the present disclosure, the display processing method further includes a step of performing a process for determining the manner in which each of the content cards is displayed depending on the relative position of the selection indicator in the card group.

In an embodiment of the display processing method according to the present disclosure, the display processing method includes a step of determining the manner in which each of the content cards is displayed depending on the relative position of the selection indicator in the card group, and performs a display process in which a content card at a position close to the selection indicator is set to an angle at which the content information is displayed and a content card at a position far from the selection indicator is set to an angle at which the content information is hidden.

In an embodiment of the display processing method according to the present disclosure, the display processing method performs a process for moving the content cards along a parametric curve and displaying a content item selected by the selection indicator at a position on the parametric curve apart from the card group with the content information being displayed.

In an embodiment of the display processing method according to the present disclosure, the display processing method further includes a step of performing a process for classifying and displaying the content cards by genre.

According to a sixth aspect of the present disclosure, there is provided a compute program for performing a process for generating device control processing data, including:

a content identification information inputting step of inputting content identification information; and a data processing step of determining a controlled device from a content-device-correspondence table storing correspondence data between content identification information and content-providing devices based on the input content identification information, and generating and outputting control information corresponding to the determined controlled device.

According to a seventh aspect of the present disclosure, there is provided a compute program for performing a content information displaying process, including:

a step of configuring content cards recording content information according to the number of content items and displaying a card group including a plurality of content cards corresponding to the number of content items as a card group that indicates only the presence of content with the content information being hidden; and a step of displaying a content item selected by a user-operable selection indicator in a portion adjacent to the card group with the content information being displayed.

According to a structure of the present disclosure, content identification information is input, a controlled device is determined from a content-device-correspondence table storing correspondence data between content identification information and content-providing devices based on the input content identification information, and control information corresponding to the determined controlled device is generated and output. Thus, the user can output desired content merely by inputting content specification information. That is, it is possible to output and view the content without performing processing necessary to output the content, such as processing on a controlled device, a channel operation to the controlled device, and searching for the content storage location.

According to a structure in an embodiment of the present disclosure, furthermore, content cards recording content information are configured according to the number of content items, and a card group including a plurality of content cards corresponding to the number of content items is displayed as a card group indicating only the presence of content with the content information being hidden. The content cards are moved on a parametric curve while changing the angle of the content cards depending on the position of, for example, a user-operable cursor so that only the content information of a small number of cards including a card selected by the user is displayed. Thus, the user can understand overall information about the entire content, and can also understand detailed information about the selected content item.

According to a structure in an embodiment of the present disclosure, furthermore, a content card recording content information including content-providing device and location information as code data facilitates acquisition of content based on the code information of the card through transmission and reception of the card.

A computer program according to the present disclosure is, for example, a computer program that can be offered by a storage medium or a communication medium in a computer-readable manner to a general-purpose computer system capable of executing various types of program code, e.g., a storage medium such as a CD, an FD, or an MO, or a communication medium such as a network. Such a computer-readable program allows processing in accordance with the program to be executed on the computer system.

Further objects, features, and advantages of the present disclosure will become apparent from the following detailed description, taken in conjunction with embodiments of the present disclosure and the accompanying drawings. In this document, the term system is a logical set of a plurality of apparatuses, and is not limited to the one having these apparatuses in a single house.

Additional features and advantages are described herein, and will be apparent from the following Detailed Description and the figures

BRIEF DESCRIPTION OF THE FIGURES

FIG. 3 is a diagram showing the structure of a content-device-correspondence table stored in the device control processing apparatus.

FIG. 10 includes diagrams showing modifications of the cursor position and the parametric curve.

DETAILED DESCRIPTION

The details of a device control processing apparatus and method, a display processing apparatus and method, and a computer program according to the present disclosure will be described hereinbelow with reference to the drawings according to various embodiment of the present disclosure.

[System Overview]

Figure 1:
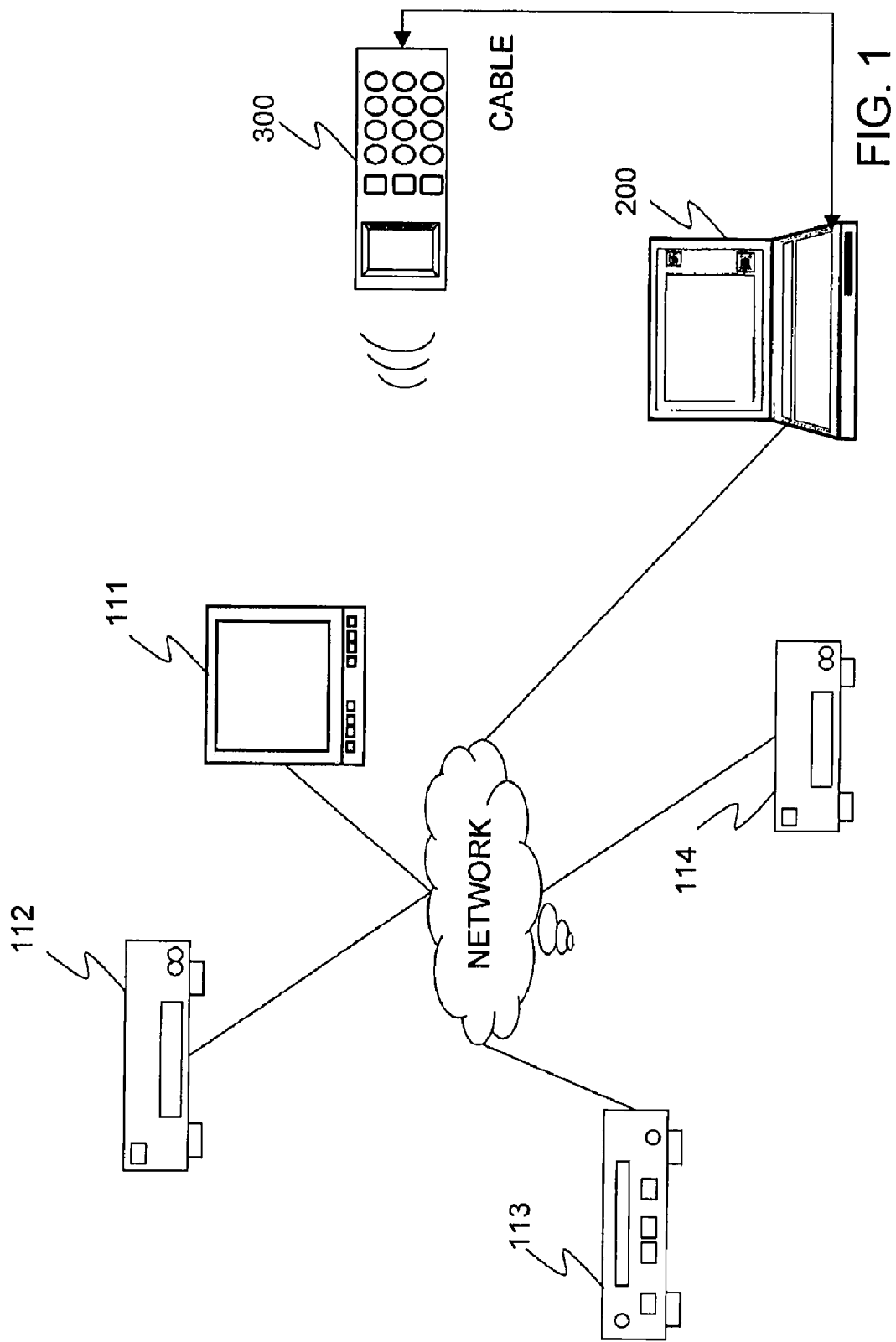
FIG. 1 is a diagram showing an example network configuration according to the present disclosure.

First, an example network configuration according to the present disclosure will be described with reference to FIG. 1. FIG. 1 shows, for example, a home network configuration having a structure in which a plurality of electronic devices are connected with one another.

A television receiver 111, a CS tuner 112, a hard disk video recorder (HDVR) 113, a DVD player 114, and a PC 200 are connected to a network. The network is a network, such as a wired or wireless network.

A user displays content information available from or through the network-connected devices on a display of the PC 200, inputs content-selection information via input means of the PC 200, and outputs a signal from a remote controller 300 that is connected to the PC 200 via a cable, thereby displaying various content items on, for example, the TV receiver 111. The content items may include, for example, content received by a terrestrial tuner provided for the TV receiver 111, content received by the CS tuner 112, content stored in the hard disk video recorder (HDVR) 113, and content played back from the DVD player 114.

The signal from the remote controller 300 is output as an operation signal to devices that provide and display the content selected by the user. The user merely inputs content-selection information via the input means of the PC 200 without being bothered with determining which device archives or receives the content, and data processing means in the PC generates control data necessary for a content acquiring and displaying process and outputs it to the remote controller 300 via the cable. The remote controller 300 outputs a remote controller signal, such as an infrared signal, according to the signal input from the PC 200.

In the configuration shown in FIG. 1, the television receiver 111, the CS tuner 112, and the hard disk that are controlled by the remote controller 300 are provided, and are configured as remote-controllable devices.

[Remote-Controller-Based Control Configuration]

The configuration of the PC 200 and the remote controller 300 serving as a device control processing apparatus will be described with reference to FIG. 2. The PC 200 serving as a device control processing apparatus for generating device control processing data stores a content-device-correspondence table 261 in a storage unit. An example structure of the content-device-correspondence table is shown in FIG. 3. The content-device-correspondence table is table data that associates content identification information, such as a content ID and a content title, with location information including a content-providing device and channel or data storage location information.

The content-device-correspondence table stores a list of information items about all content items available from or through the network-connected content-providing devices, i.e., the television receiver 111, the CS tuner 112, the hard disk video recorder (HDVR) 113, the DVD player 114, and the PC 200.

One known protocol suitable for the home network configuration is Universal Plug and Play (UPnP). Universal Plug and Play (UPnP) allows for easy establishment of networks without the accompanying complex operation, and allows network-connected devices to receive services provided by connected devices without the accompanying difficult operation or setting-up. UPnP also has the advantage of the easy addition of devices without replying on an OS (operating system) on the devices.

UPnP allows XML (eXtensible Markup Language) definition files to be exchanged between the connected devices for mutual authentication between the devices to acquire service information available from the devices. Thus, when the network-connected devices shown in FIG. 1 are UPnP-compatible devices, the PC 200 may acquire content information through a service information acquisition process according to the UPnP standard, and may generate the content-device-correspondence table shown in FIG. 3 based on the acquired information.

In the example table shown in FIG. 3, the top two entries indicate content information that can be received by the terrestrial tuner provided for the television receiver 111. The middle two entries indicate content information that can be received by the CS tuner 112. The bottom two entries indicate content information that is available through the hard disk video recorder (HDVR) 113. FIG. 3 shows a partial data example, and other content information about all network-connected devices, such as content information associated with the DVD player, is also stored.

Referring back to FIG. 2, the configuration of the PC 200 and the structure in which the PC 200 is connected to the remote controller 300 will be described. The PC 200 includes a data processor 200, an input unit 263 including a keyboard and a mouse, an output unit 262 including a display and a speaker, and a connectable interface 264, such as a USB device, serving as a unit connecting to the remote controller 300.

The data processor 250 includes a CPU and a memory as hardware. FIG. 2 shows the software configuration implemented on the data processor. Data input/output software acquires content information from the content-device-correspondence table based on a user input from the input unit 263, and outputs the content information to the output unit 262, such as the display. The content information output to the output unit 262, such as the display, may be the content-device-correspondence table shown in FIG. 3, or a display manner that makes it easy for the user to select content may be generated and displayed. The structure of a content information display process according to the present disclosure is discussed below.

The user selects one desired content item from the content information items output to the output unit 262, and inputs content identification information as selection information via the input unit 263. The content-selection information is interpreted by the data input/output processing software, and is passed to scripts for generating control information for devices that provide the selected content item.

For example, when the content selected by the user is content that is provided by the CS tuner 112 and that is displayed on the TV receiver 111, content-selection information is passed to a CS operation script and a TV operation script. These scripts generate control information necessary to output the selected content, and pass it to remote-controller control software. The remote-controller control software generates remote-controller control information based on the information received from the scripts.

The remote-controller control information is output to the remote controller 300 that is cable-connected via the interface 264 such as a USB device.

The remote-controller control information is input to a data processor 302 in the remote controller 300 via an interface 301 of the remote controller 300. The data processor 302 generates a control signal (e.g., an infrared signal) necessary to output the selected content based on information from a configuration information storage unit 303 in which data about control signal information corresponding to each of the network-connected devices is recorded and the remote-controller control information from the PC 200, and outputs the control signal via a control signal output unit 304.

For example, when the content selected by the user is content that is provided by the CS tuner 112 and that is displayed on the TV receiver 111, control signals that are output from the remote controller include content output control information specifying the content affiliated with the CS tuner 112, and a control signal for switching the input of the TV receiver 111 to the CS tuner.

The original data of these control signals is information generated by the CS operation script and the TV operation script in the PC 200 based on the content-selection information.

Figure 2:
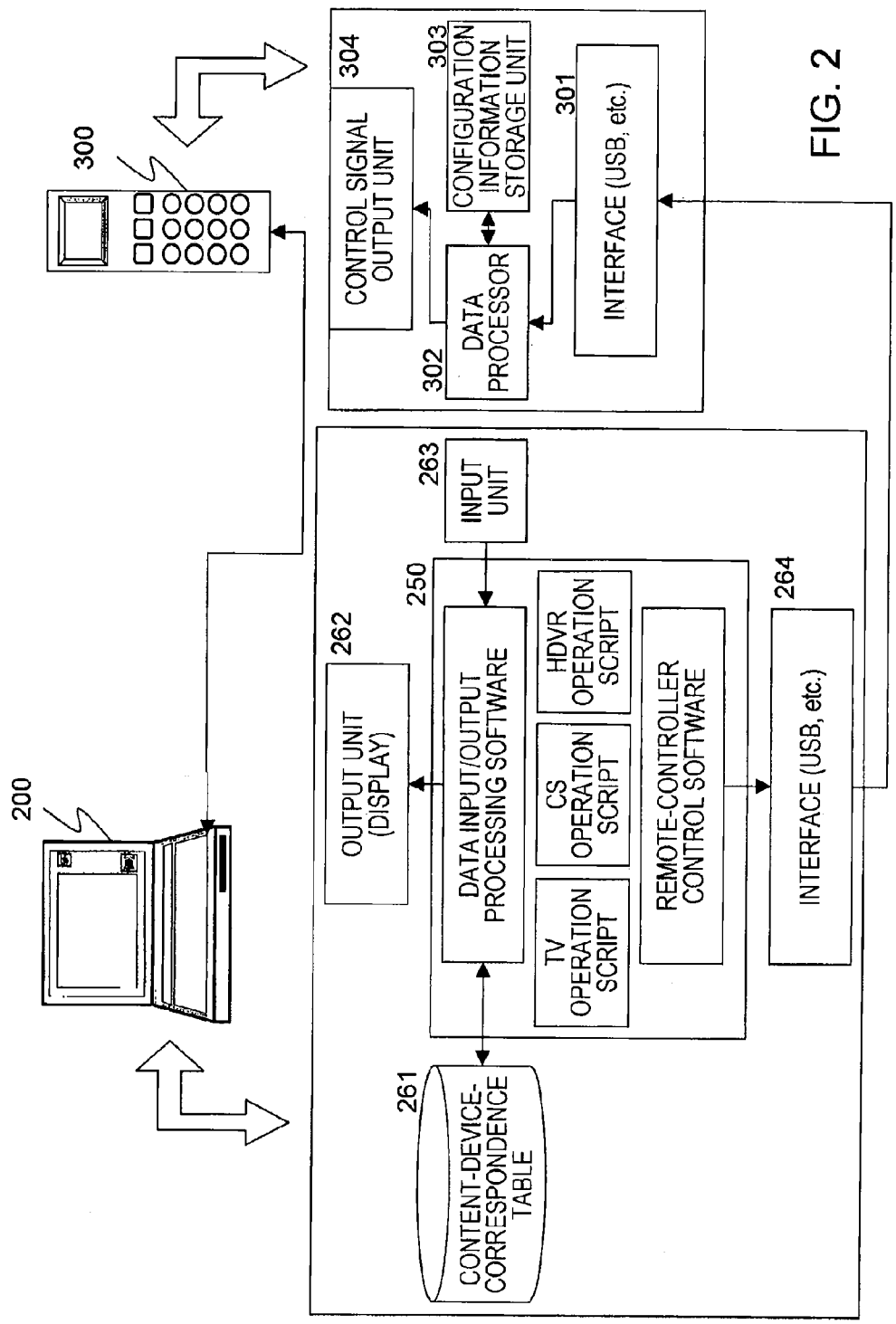
FIG. 2 is a diagram showing the structure of a device control processing apparatus that generates device control processing data.

In the configuration shown in FIG. 2, only the TV operation script, the CS operation script, and a hard disk video recorder (HDVR) script are provided in the data processor 250. Other than these scripts, programs for generating control information for the content available from or through the network-connected devices, such as a script for generating DVD control information and a PC control script for performing selection control on various web pages received via the Internet by the PC through specification of URL (Uniform Resource Locators), are stored and are executable on the data processor, thereby converting content specification information about the content provided by the network-connected devices into remote-controller control information. The remote-controller control information is output to the remote controller, and the content items provided by various devices can be viewed based on the control signals from the remote controller.

Figure 4:
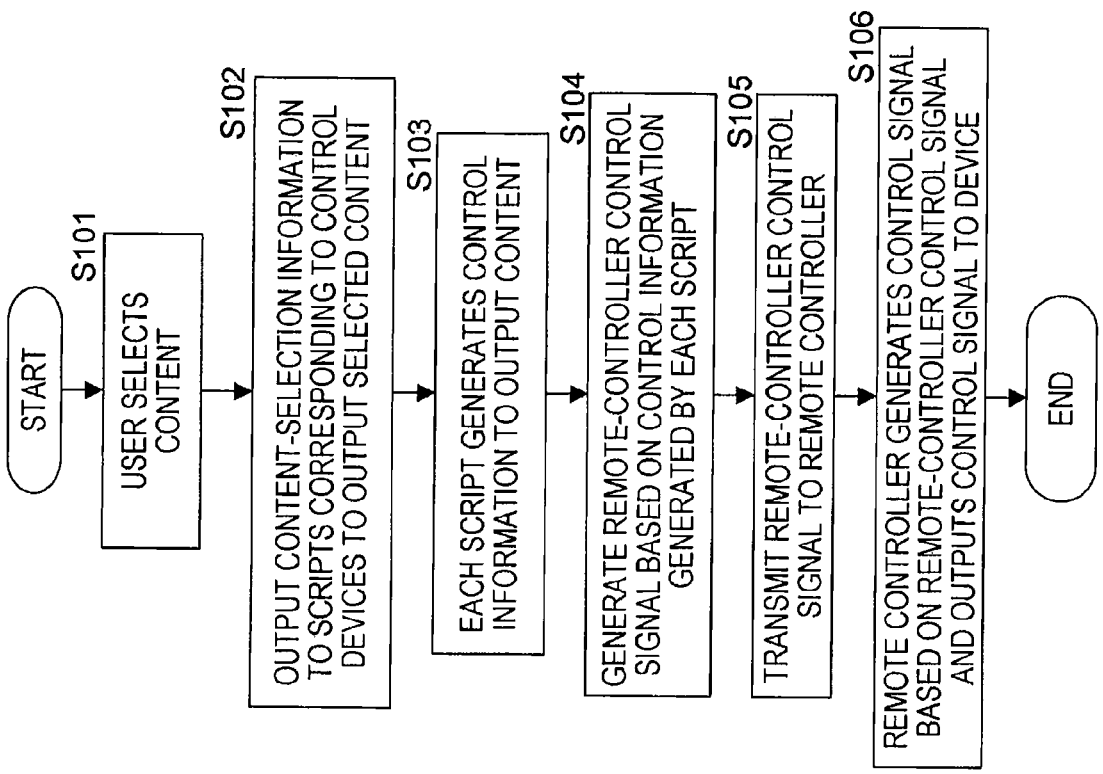
FIG. 4 is a diagram showing a sequence for generating device control processing data, which is performed by the device control processing apparatus.

Next, a procedure from a content selection process performed by the user to a control signal outputting process performed by the remote controller will be described with reference to FIG. 4.

First, in step S101, the user inputs content-selection information via the input means of the PC. In step S102, the content-selection information is interpreted by the data input/output processing software, and the content-selection information is passed to the scripts corresponding to control devices for outputting the selected content.

In step S103, each script generates control information necessary to output the selected content, and passes it to the remote-controller control software. In step S104, the remote-controller control software generates remote-controller control information based on the information received from the scripts.

In step S105, the remote-controller control information is transmitted to the remote controller that is cable-connected via the interface such as a USB device. In step S106, the remote-controller control information is input to the data processor in the remote controller, and a control signal (e.g., an infrared signal) necessary to output the selected content is generated based on the remote-controller control information and is output via the control signal output unit.

Therefore, the user can output desired content merely by inputting content specification information. That is, it is possible to output and view the content without performing processing necessary to output the content, such as processing on a control device, a channel operation to the control device, and searching for the content storage location, and the load on the user can greatly be reduced.

[Structure for Displaying Content Information Using Content Card]

Next, an example structure of a content-selection user interface that allows the user to more efficiently select content will be described.

In the following description, the content-selection user interface can be used as, for example, a device adapted to display content information available from or through network-connected devices on the display of the PC 201 shown in FIG. 1, or may be implemented as a structure for displaying content information specific to only the content stored in an independent device, e.g., a hard disk video recorder. For example, a content-card-based user interface, discussed below, is displayed on a display processing apparatus, such as a PC, having a display connected to the hard disk video recorder via a cable or a network.

A process for generating and displaying a user interface is performed by display data generating means in a PC or the like. Specifically, a program executing the following process is stored in a display processing apparatus constructed by a PC or the like, and a content-selection user interface is generated as display information under the control of the CPU.

Figure 5:
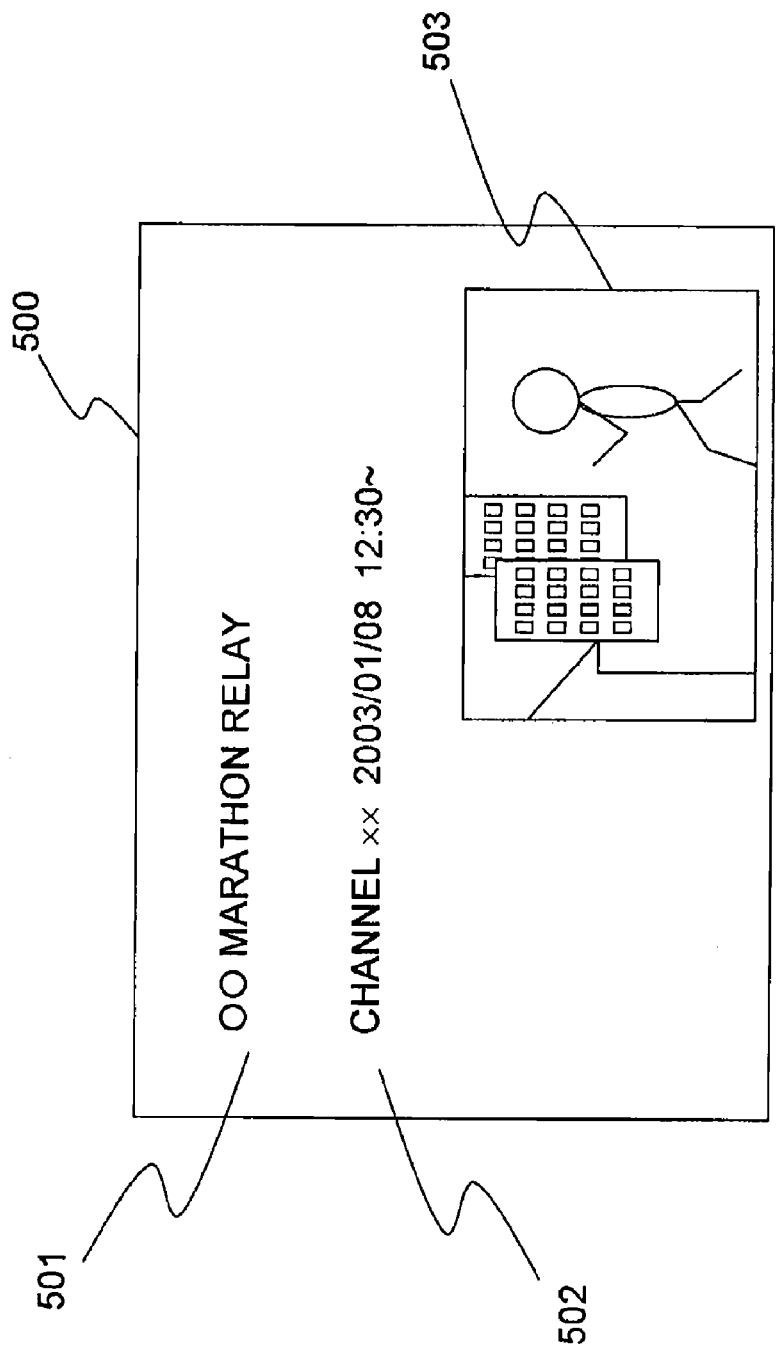
FIG. 5 is a diagram showing an example structure of a content card.

A content card in which content information is configured in the form of a card is used for the content-selection user interface. FIG. 5 shows an exemplary content card. As shown in FIG. 5, a content card 500 is data including a content title 501, accompanying information 502, such as channel information and date-and-time information, and a thumbnail image 503.

For example, when a TV broadcast input from an antenna is stored in a hard disk, the TV broadcast is encoded into the digital video format, such as MPEG, and is then stored in the hard disk, and accompanying information, such as EPG (Electronic Program Guide) including the program title, the start time, and the genre, is also recorded so that the content is classified into genres and archived. In order to browse content, the content is retrieved from the hard disk and is output via a decoder.

Figure 6:
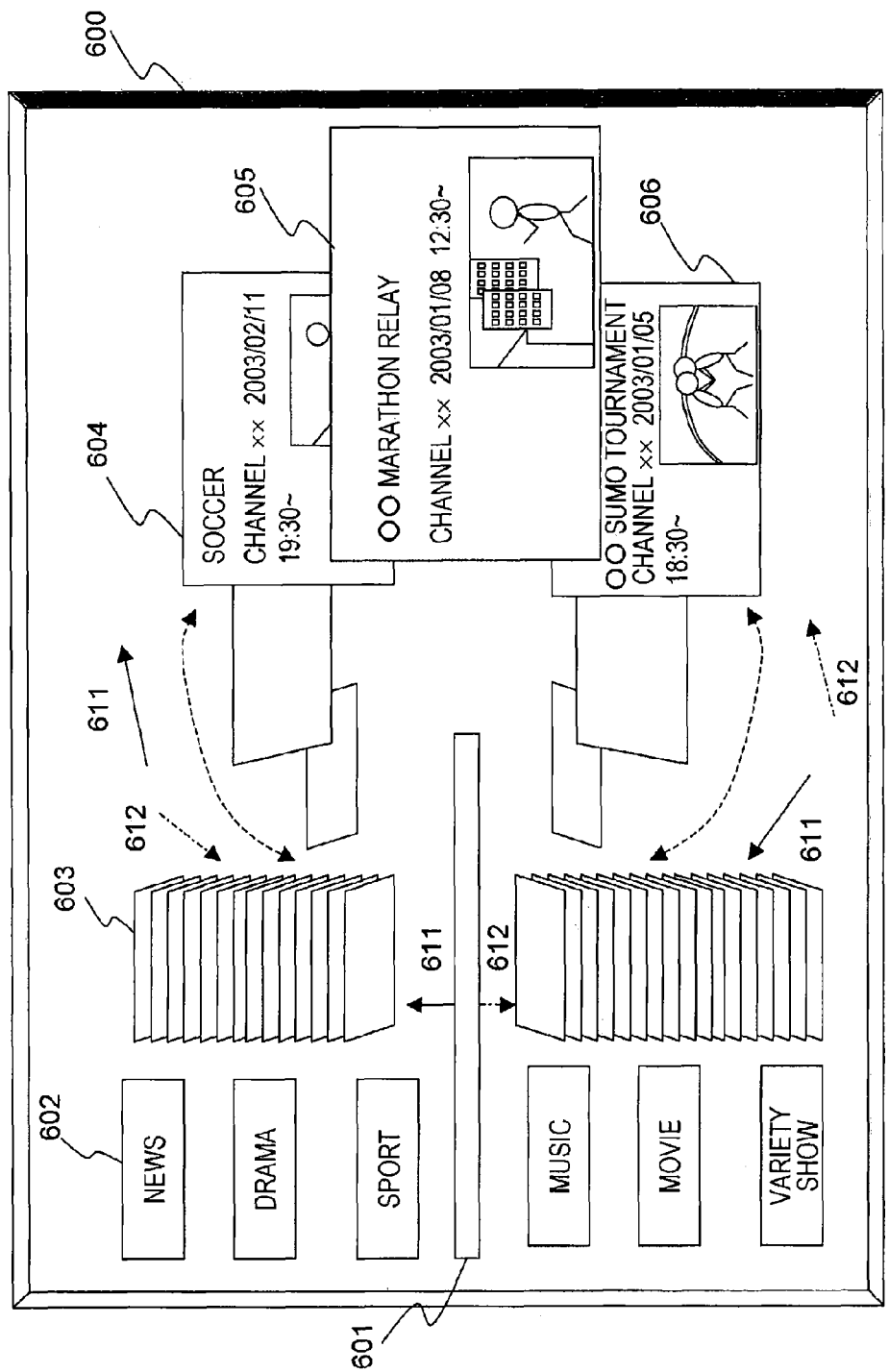
FIG. 6 is a diagram showing a content-card-based user interface that is generated by a display processing apparatus according to the present disclosure.

FIG. 6 shows an example structure of a user interface for content-card-based content selection.

Content information is presented on a display 600 using content cards that are configured in association with content provided by network-connected devices. A user-operable selection indicator that can be operated by the user, or a cursor 601, is moved up and down to sequentially move the content cards along an arrow 611 or 612 so that different content cards can be presented in turn.

A content card group 603 indicates all content cards configured in association with content items provided by network-connected devices. The content cards are classified by category based on genre information 602, such as news and drama.

The user moves the cursor 601, for example, up (along the arrow 611) to display content information items in genres of sport, drama, and news. When the cursor 601 is moved up (along the arrow 611), the content cards move along the arrow 611. Specifically, content information items in the genres of sport, drama, and news in the content card group 603 are sequentially displayed clockwise in the region right to the content card group 603.

In the example shown in FIG. 6, a content card 605 is displayed in the maximum size in front of all other content cards. When the cursor 601 is moved up (along the arrow 611), the content card 605 is moved to the position of a content card 606, and a content card 604 is set at the position of the content card 605.

When the cursor 601 is moved down (along the arrow 612), the content cards are moved along the arrow 612. Specifically, content information items in the genres of music, movie, and variety show in the content card group 603 are sequentially displayed counterclockwise in the region right to the content card group 603. In this case, the content card 605 is moved to the position of the content card 604, and the content card 606 is set to the position of the content card 605.

On the left side of the screen, therefore, all selectable content items are classified by genre and are shown as a content card group. The cursor 602 indicates a portion that is currently focused by the user. The content genres give criteria to help the user select content. Each content card is drawn in a small size, and the detailed information cannot be obtained while overview information, such as which genre the cursor 602 currently indicates, and whether the cursor 602 is placed in an upper portion or a lower portion across the whole range of options, can be obtained from here.

On the right side of the screen, the details of the content item focused by the user are displayed. All information included in a content card is displayed here, and the title, the channel, the broadcast date and time, the thumbnail image, etc., can be viewed. The content card 605 at the center is the content item that is currently focused by the user. The cards farther from the center are smaller in drawing area, and are finally joined into the content card group 603 on the left side. As such, it is a feature that the overview display and the detailed display are successively provided.

Movement of the content cards when the cursor 602 is moved down will be described with reference to FIG. 7.

Figure 7:
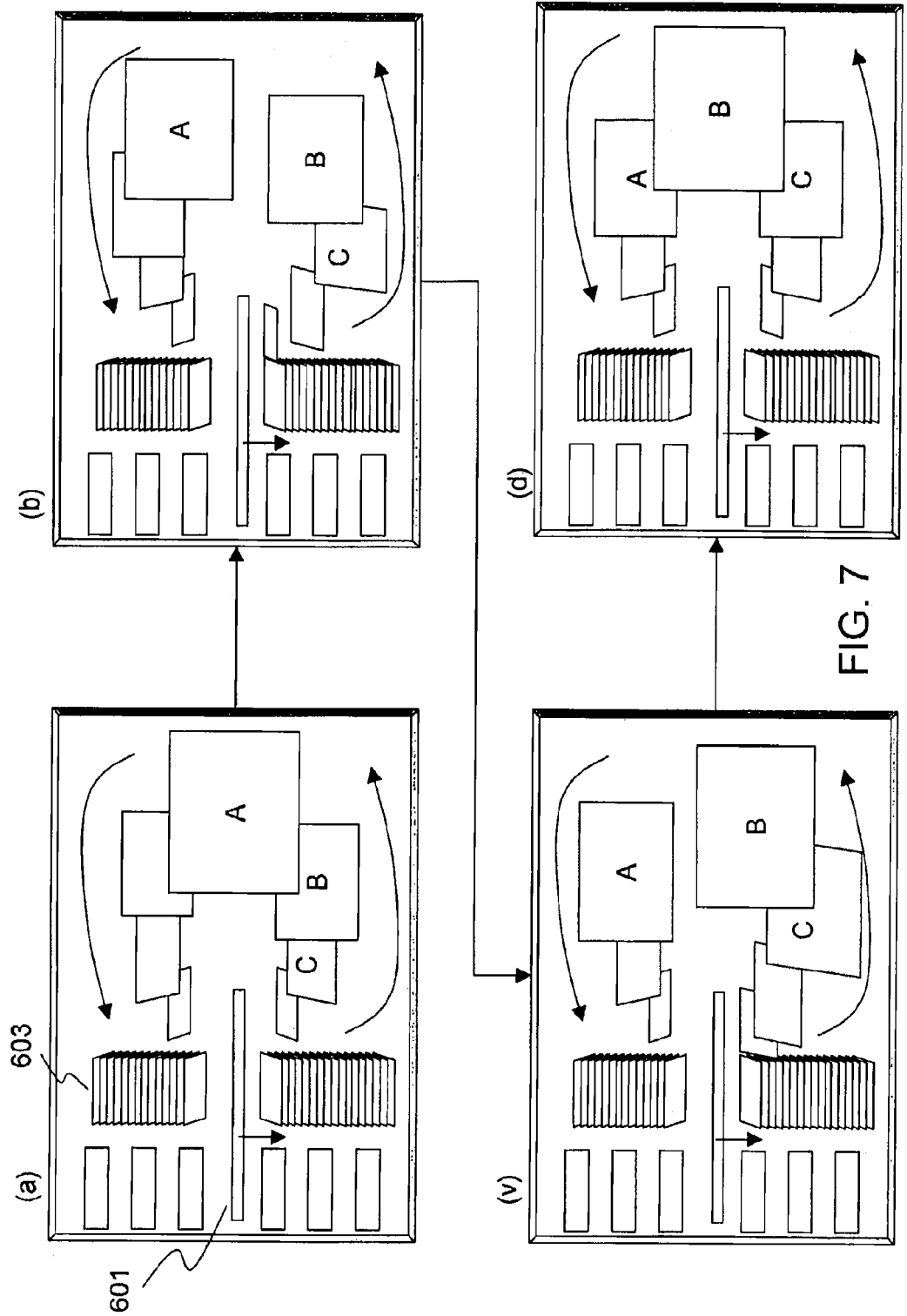
FIG. 7 includes diagrams showing the display manner on the content-card-based user interface.

In FIG. 7, when the cursor 602 is moved down, the content cards move counterclockwise in the region right to the content card group 603. Each of the content cards moves according to the order of FIGS. 7(a), 7(b), 7(c), and 7(d).

Figure 8:
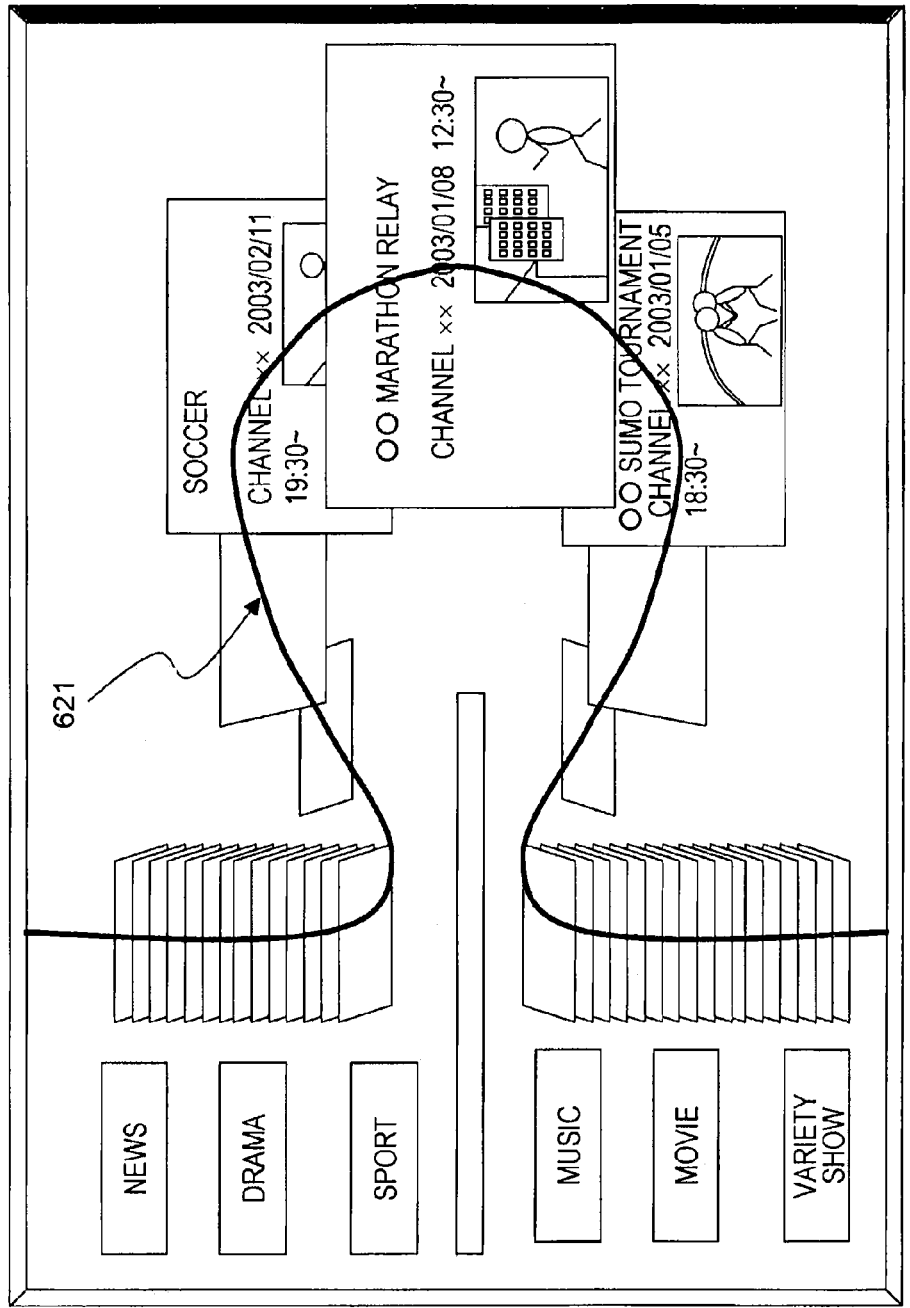
FIG. 8 is a diagram showing the movement of the content cards.

The curve along which each of the content cards moves is depicted by, for example, a parametric curve. FIG. 8 shows a content card movement curve 621 along each of the content cards. Parametric curves are curves defined by substituting values of parameters 0 to 1 into an interpolation formula that is generated based on the coordinates of control points. Known parametric curves are a Bezier curve, a spline curve, etc.

Figure 9:
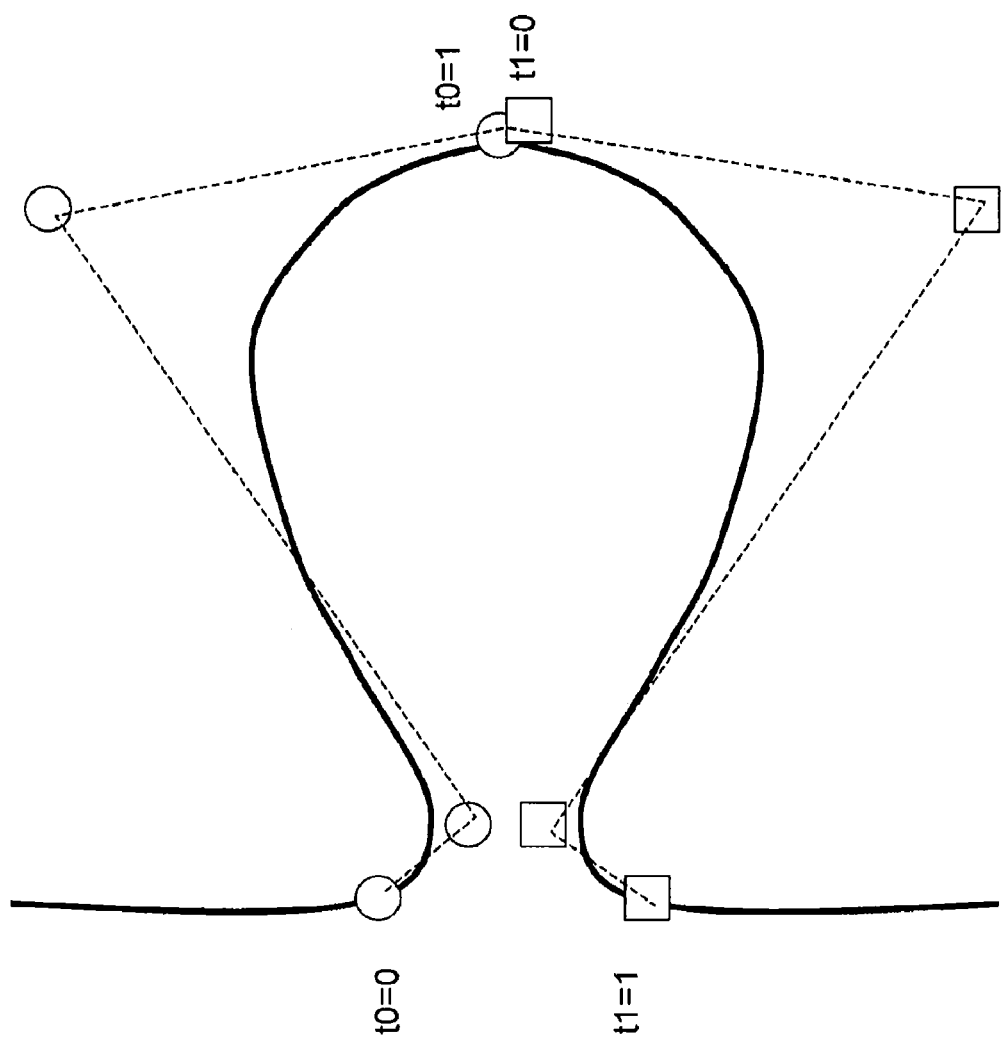
FIG. 9 is a diagram showing a parametric curve.

The content card movement curve 621 includes two upper and lower parametric curves shown in FIG. 9, specifically, a parametric curve with a parameter t0, defined by control points indicated by circles shown in FIG. 9, and a parametric curve with a parameter t1, defined by control points indicated by squares. The rightmost control point is a control point common to the two upper and lower curves.

FIG. 10 includes illustrations showing changes of the parametric curve when the cursor 601 moves. FIG. 10(b) shows the state where the cursor 601 is placed at the center of the movement curve, FIG. 10(a) shows the state where the cursor 601 is placed above the movement curve, and FIG. 10(c) shows the state where the cursor 601 is placed below the movement curve. In these states, the control points on the right side are fixed, and the control points on the left side move up and down along with a change of the cursor.

Figure 11:
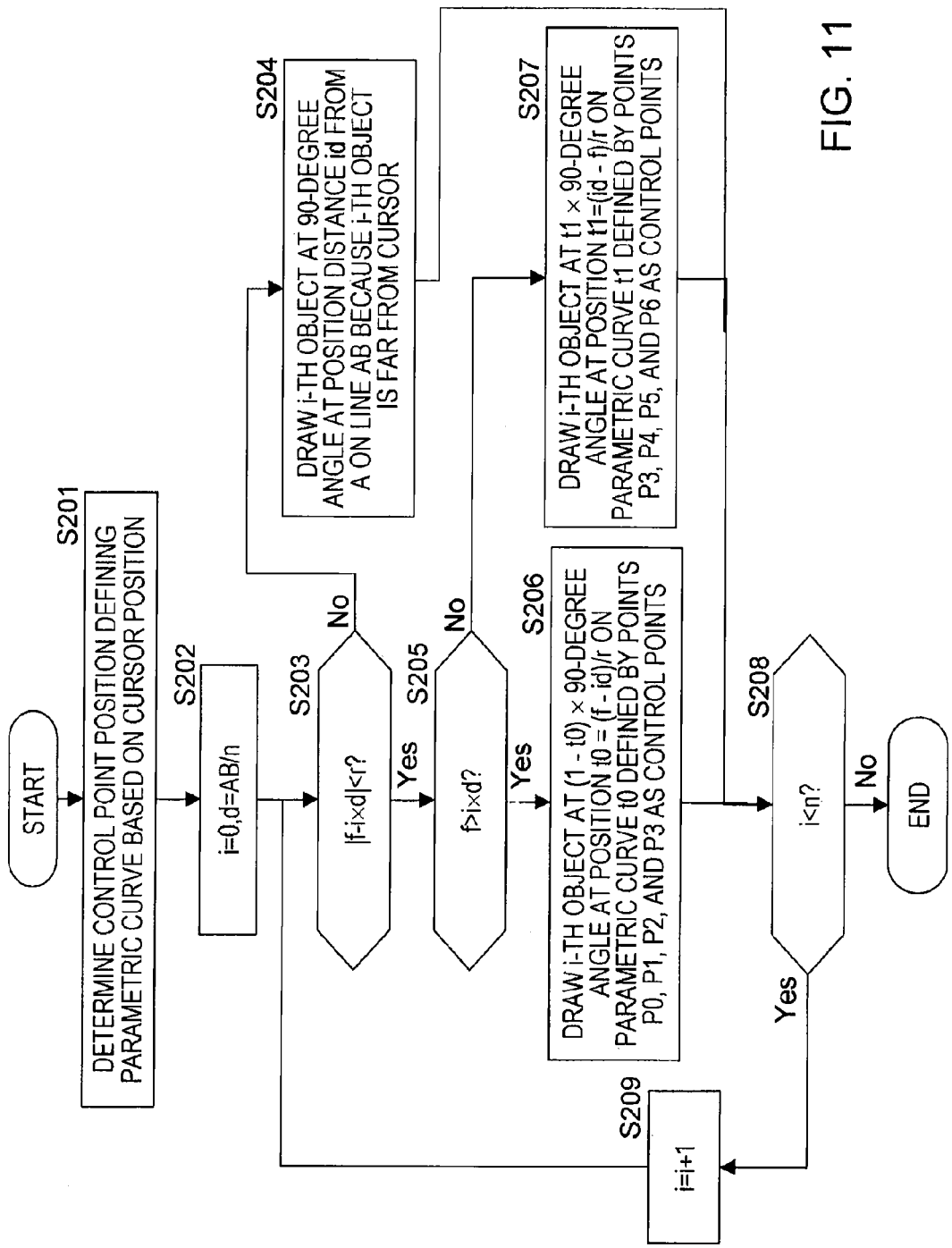
FIG. 11 is a flowchart showing a display processing sequence on a content-card-based user interface.
Figure 12:
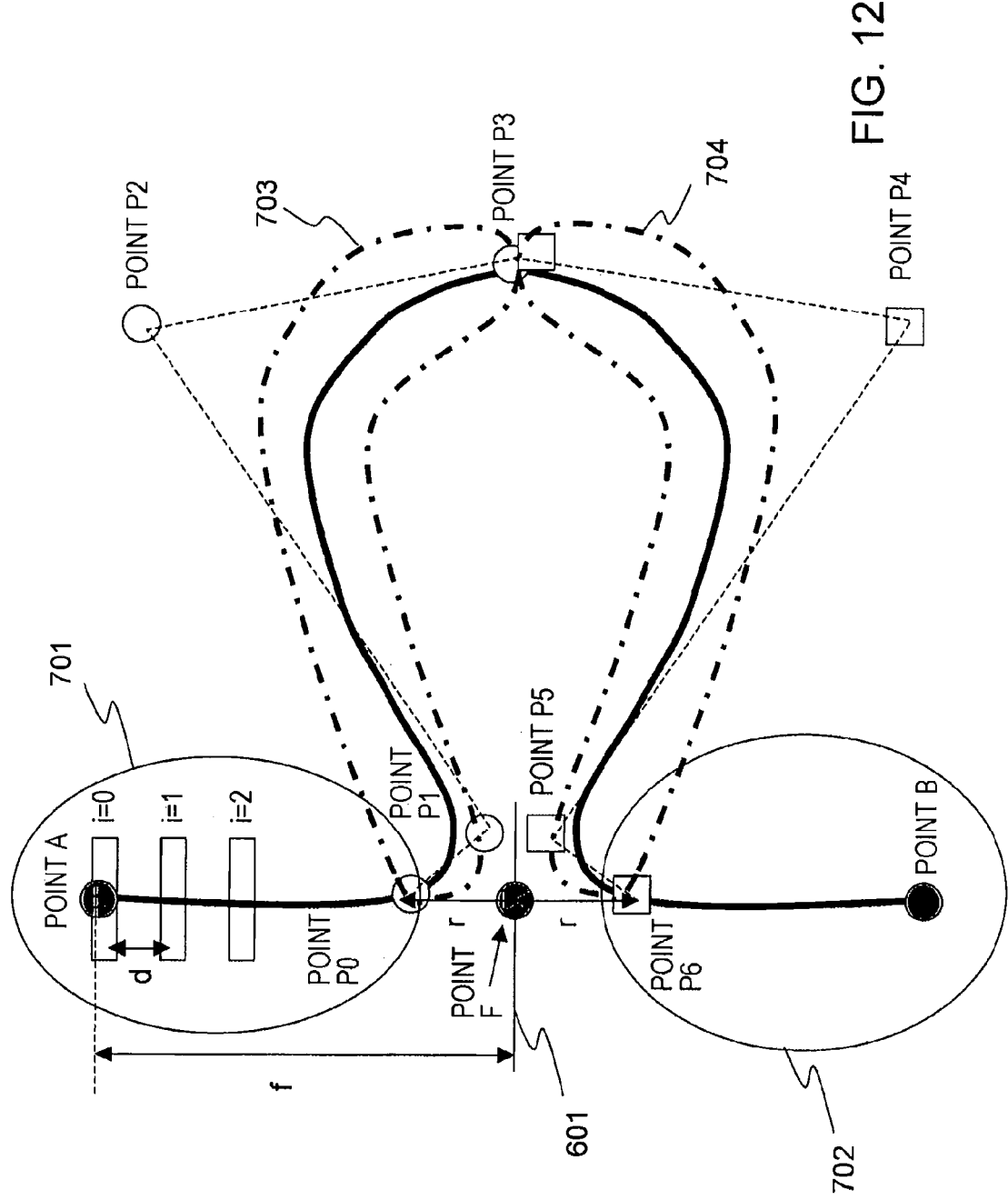
FIG. 12 is a diagram showing parameters, etc., used for the display process on the content-card-based user interface.

FIG. 11 is a flowchart showing a procedure for defining a parametric curve based on the position of the cursor 601 and drawing content cards on the defined parametric curve. FIG. 12 is an illustration showing parameters used for the content card drawing process.

The process for drawing content cards on a parametric curve will be described with reference to FIGS. 11 and 12.

Referring to FIG. 11, in step S101, control point positions defining a parametric curve are determined based on the cursor position.

As described above, a curve along which content cards move includes two upper and lower parametric curves, specifically, a parametric curve with a parameter t0, defined by control points indicated by circles shown in FIG. 12, and a parametric curve with a parameter t1, defined by control points indicated by squares, and these control points, i.e., control points P0 to P6, are determined.

In step S202, initialization of i=0 and d=AB/n is performed, where i is a value of 0 to n corresponding to the order of the content cards. The card with i=0 is set at the upper end A of the parametric curve shown in FIG. 12, and the card with i=n is set at the lower end B. The value d=AB/n denotes the distance between cards in the content card group, as indicated between i=0 and i=1 in FIG. 12.

The processing of step S203 and the following steps is performed on each content card, i.e., each of the content cards with i=0 to n.

In step S203, it is determined whether or not |f−i×d|<r is satisfied for the i-th content card to be drawn, where, as shown in FIG. 12, f denotes the distance from a point F at which the cursor is located to the upper end point A, and r denotes the distance from the point F to the control point P0 of the parametric curve with the parameter t0.

When the i-th content card to be drawn is in a region 701 or 702 shown in FIG. 12, |f−i×d|<r is not satisfied. In this case, the process proceeds to step S204, where the i-th object is drawn at a 90-degree angle at the position a distance id from the point A on the line AB because the i-th object is far from the cursor.

If it is determined in step S203 that |f−i×d|<r is satisfied for the i-th content card to be drawn, the process proceeds to step S205, where it is determined whether or not f>i×d is satisfied.

When the i-th content card to be drawn is in a region 703 shown in FIG. 12, f>i×d is satisfied. In this case, the process proceeds to step S206, where the i-th object is drawn at a (1−t0)×90-degree angle at the position t0=(f−id)/r on the parametric curve t0 defined by the points P0, P1, P2, and P3 as the control points.

When the i-th content card to be drawn is in a region 704 shown in FIG. 12, f>i×d is not satisfied in step S205. In this case, the process proceeds to step S207, where the i-th object is drawn at a t1×90-degree angle at the position t1=(id−f)/r on the parametric curve t1 defined by the points P3, P4, P5, and P6 as the control points.

As described above, the content card is displayed at a 90-degree angle in step S204, and is displayed at a gentler angle in steps S206 and S207 as the content card moves to the right in FIG. 12.

Therefore, the content cards move along the movement curve so that the content cards in the content card group in the left portion shown in FIG. 12, i.e., the content cards in the regions 701 and 702, are tilted at 90 degrees, while reducing the angle as the content cards move to the right, and the content card at the right end is tilted at 0 degrees, that is, the full face of the content card is displayed.

In step S208, it is determined whether or not i<n is satisfied. Satisfaction of the inequality i<n implies that a content card to be drawn remains. Then, in step S209, the value i is updated, that is, i=i+1, and the process for drawing the next content card is performed.

If it is determined in step S208 that i<n is not satisfied, it implies that all content cards have been drawn, and the process ends. This drawing sequence is repeatedly performed along with the movement of the cursor.

Three-dimensional computer graphics allow an object far from a camera to be drawn in a small size and an object close to the camera to be drawn in a large size. Thus, the straight line AB is located far from the camera and the points P2, P3, and P4 are located close to the camera, thereby drawing the content cards in different sizes for the overview display and the detailed display. The size of the content cards may be two-dimensionally explicitly specified.

Figure 13:
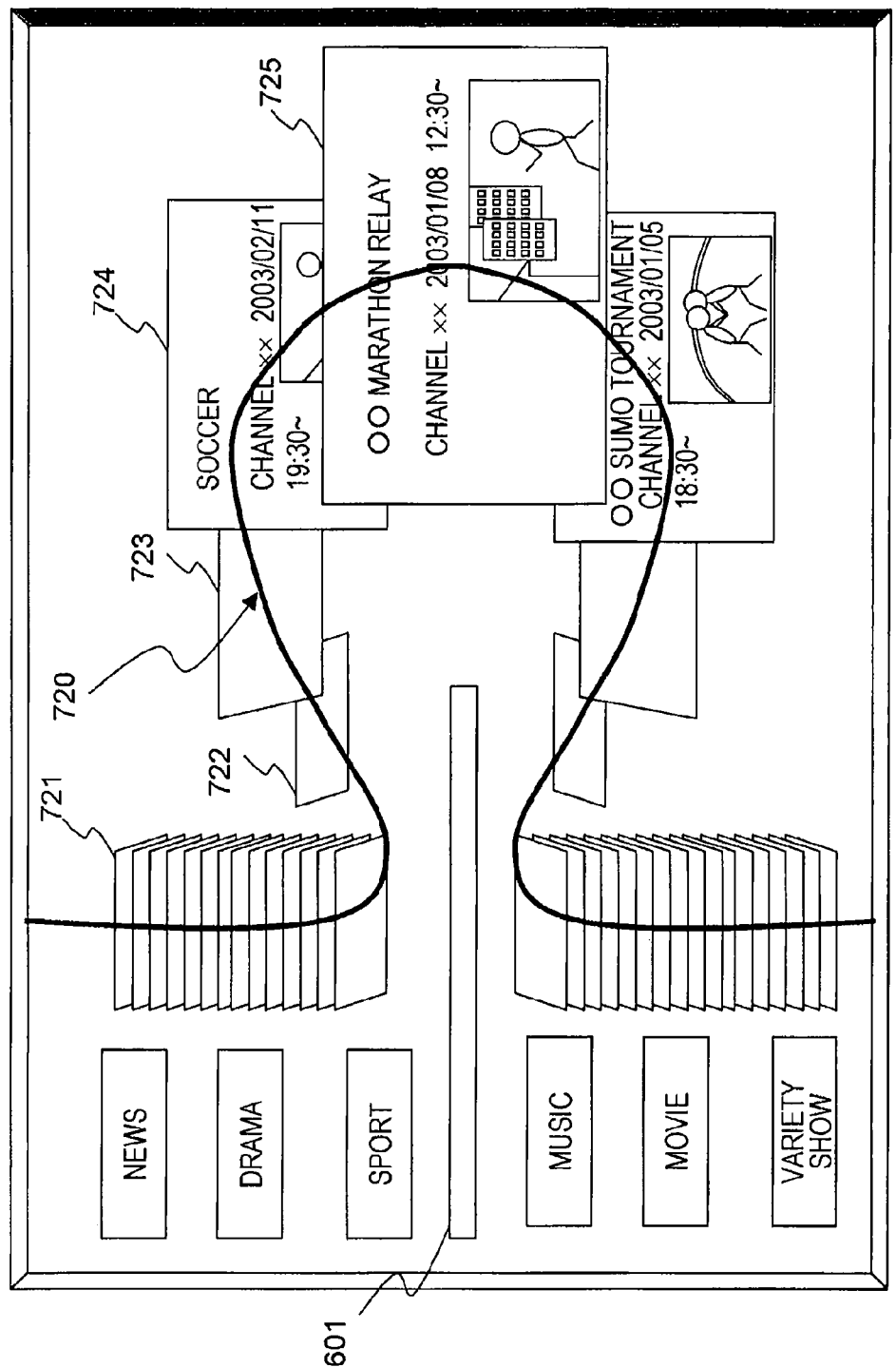
FIG. 13 is a diagram showing a display process on the content-card-based user interface.

By performing such a drawing process, as shown in FIG. 13, content cards 721 in a content card group in the left region are displayed at a 90-degree angle, and the angle for content cards 722, 723, and 724 to the right along a parametric curve 720 on the right region is reduced. At the right end, the angle is 0 and a content card, like a content card 725, is displayed so that all content information is presented on its front face.

[Physical Content Card with Bar Code Recorded]

Next, a content card is not displayed on the display but is implemented as a card (physical content card) carried by a user, and the content card is configured to record a bar code indicating content-providing device and location information. The bar code on the content card is read by a bar code reader, and the content can be provided based on the read information.

Figure 14:
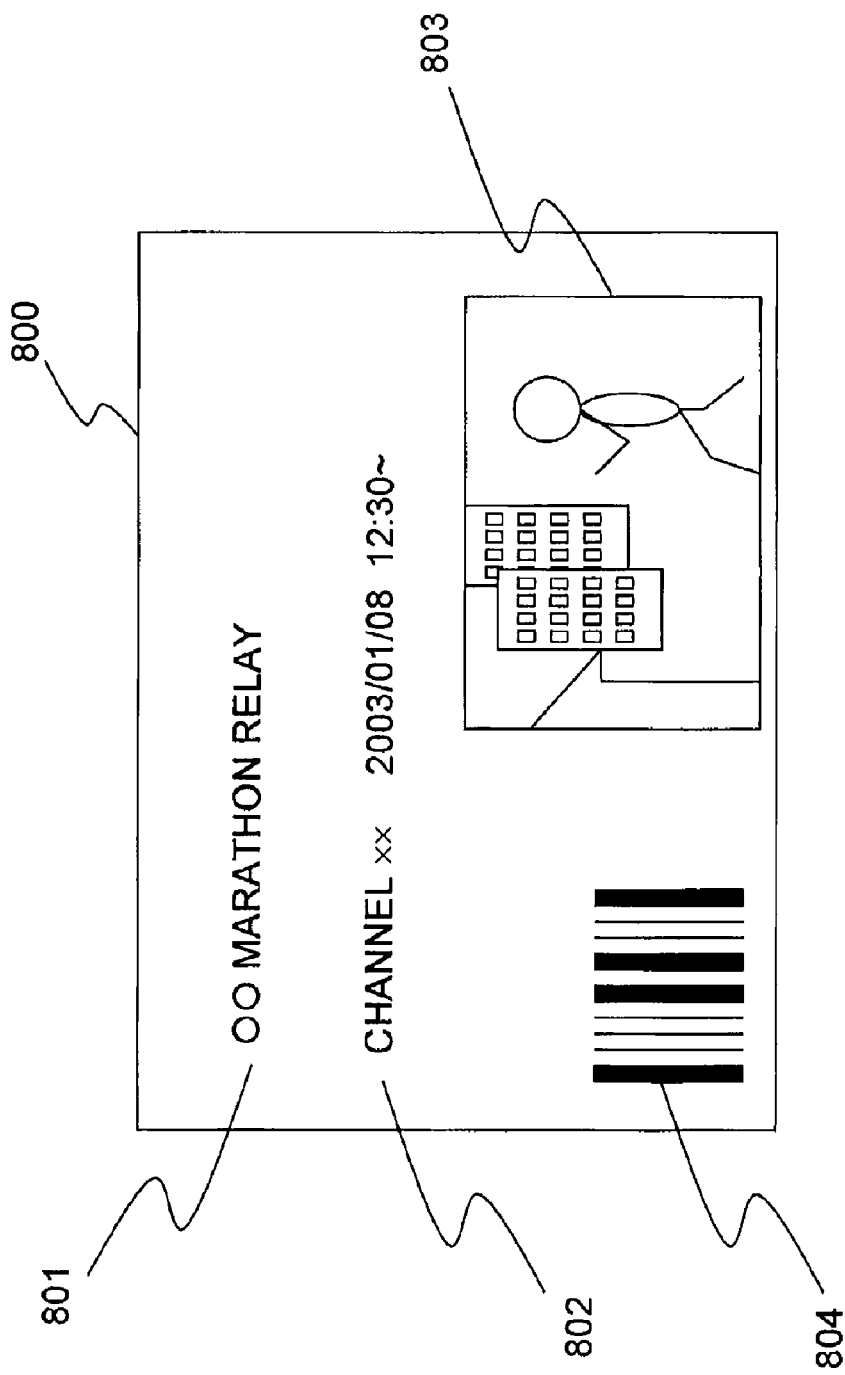
FIG. 14 is a diagram showing a physical content card.

FIG. 14 shows a physical content card 800 having a bar code indicating content-providing device and location information. The content card 800 has a content title 801, accompanying information 802, such as channel information and date-and-time information, a thumbnail image 803, and a bar code 804 indicating the content-providing device and location information. The location information is information associated with the content, such as channel information, storage location information, and URL (Uniform Resource Locators).

Figure 15:
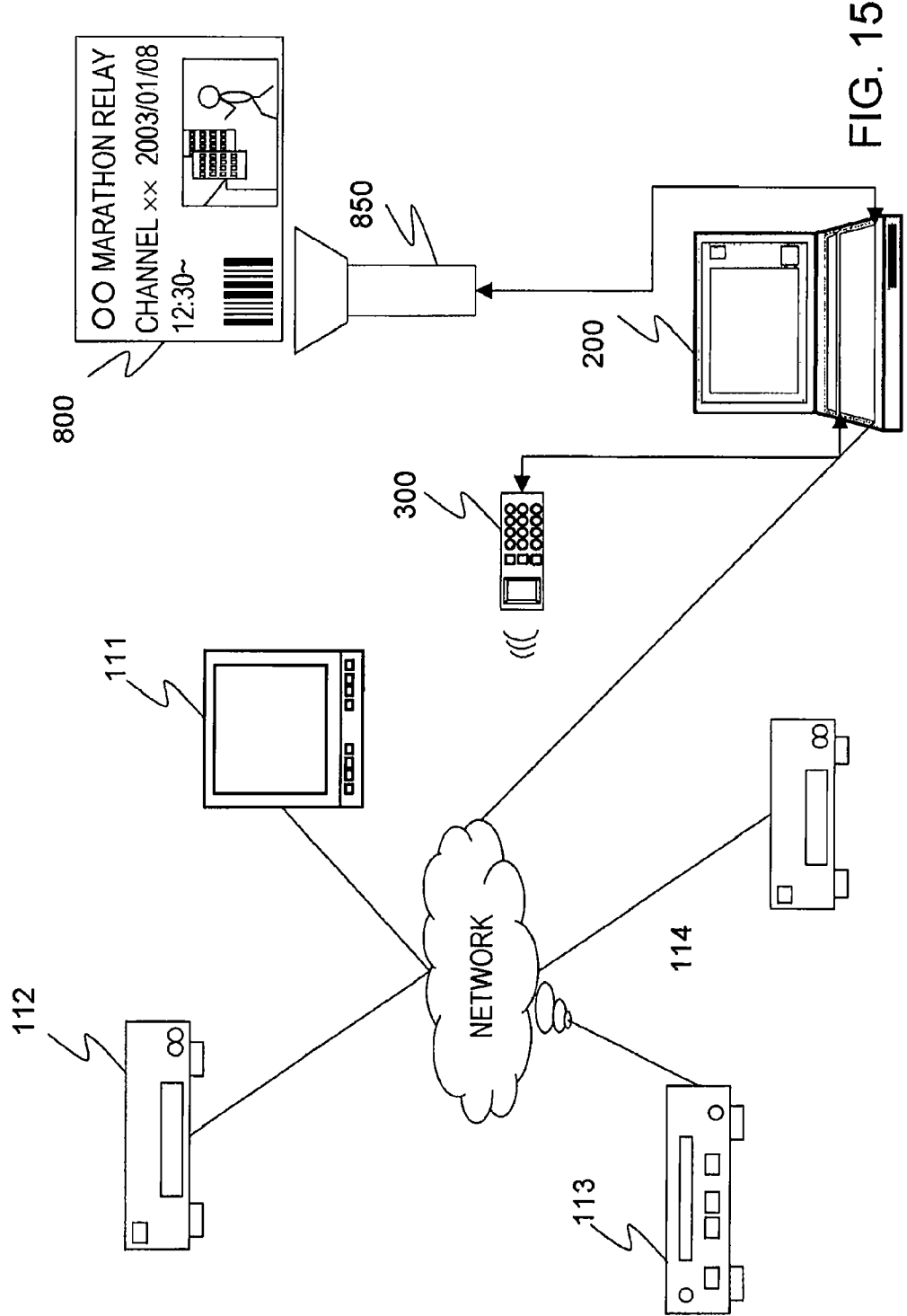
FIG. 15 is a diagram showing the usage of the physical content card.

The usage of a content card having a bar code will be described with reference to FIG. 15. A user selects one desired content card 800 from multiple content cards, and causes a bar code reader 850 connected to data processing means, such as a PC 200, to read the bar code on the content card 800.

The read bar code information is input to the data processing means such as the PC 200. According to the content-providing device and location information included in the read information, the data processing means generates control information affiliated with the content-providing device and outputs a control signal to controlled devices via a network or via a remote controller 300. The process for generating control information in the PC 200 is similar to the process described above with reference to FIGS. 2 to 4.

Content acquisition performed according to the content-providing device and location information is not limited to a structure directed to remote-controllable devices in a home network. For example, the content-providing device and location information may be URL information as an address of a content-providing server connected via the Internet or content location information. In this case, the PC performs an access based on the content access information read from the bar code, such as URL, and acquires the content.

Figure 16:
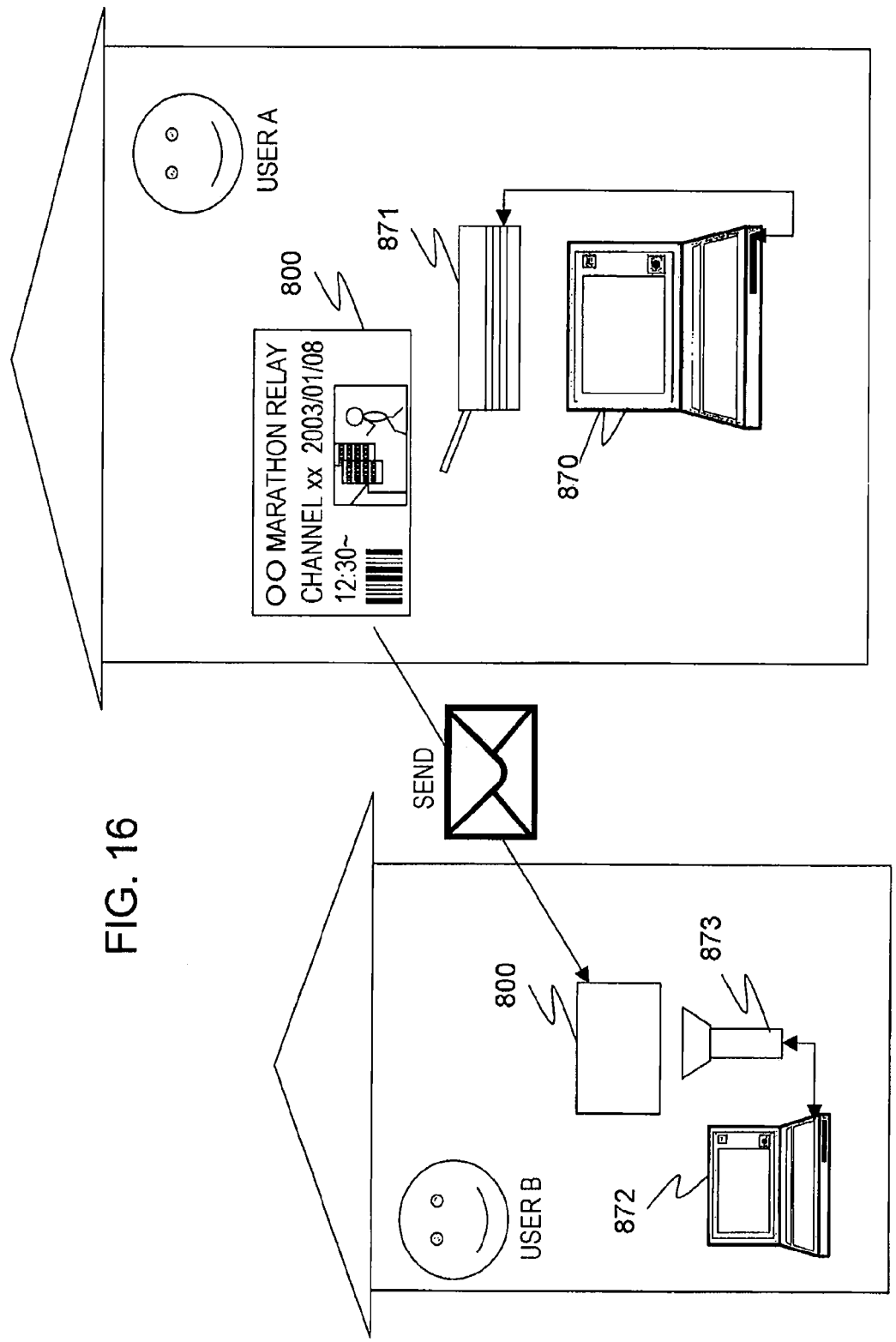
FIG. 16 is a diagram showing an example structure using the physical content card.

The way how to use a physical content card having a bar code including content-providing device and location information will be described with reference to FIGS. 16 and 17. For example, as shown in FIG. 16, using a PC 870, a user A acquires network-delivered content from certain content acquisition URL or content from a server in a home network, generates a content card corresponding to the acquired content, and stores it in a storage unit of the PC 870.

The user A uses a printer 871 connected to the PC 870 to print a physical content card based on the content card information stored in the storage unit of the PC 870. The printed physical content card has a bar code including content-providing device and location information printed thereon. In this case, the content-acquisition URL information is recorded as a bar code.

The user A sends the physical content card to a user B by mail or the like. The user B uses a bar code reader 873 connected to a PC 872 of the user B to read the bar code on the physical content card 800. The PC 200 performs a content acquisition process via a network based on the URL included in the read information of the bar code.

Figure 17:
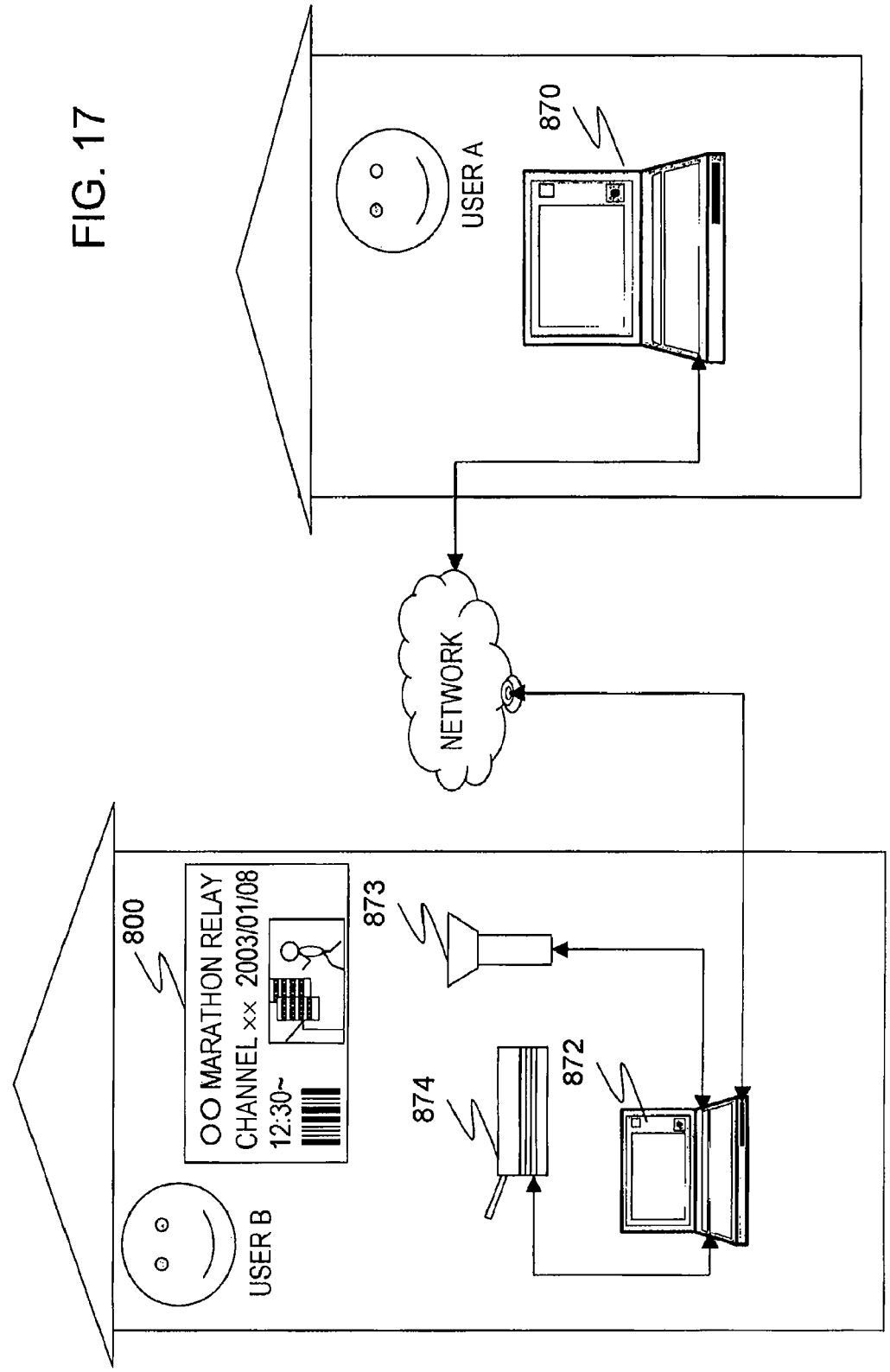
FIG. 17 is a diagram showing an example structure using the physical content card.

Alternatively, as shown in FIG. 17, content card information may be transmitted from the PC 870 of the user A to the PC 872 of the user B via a network. On the side of the user B, the physical content card 800 may be printed by a printer 874, the bar code on the printed card may be read by the bar code reader 873, and the content may be acquired based on the read information.

[Hardware Configuration of Information Processing Apparatus]

Figure 18:
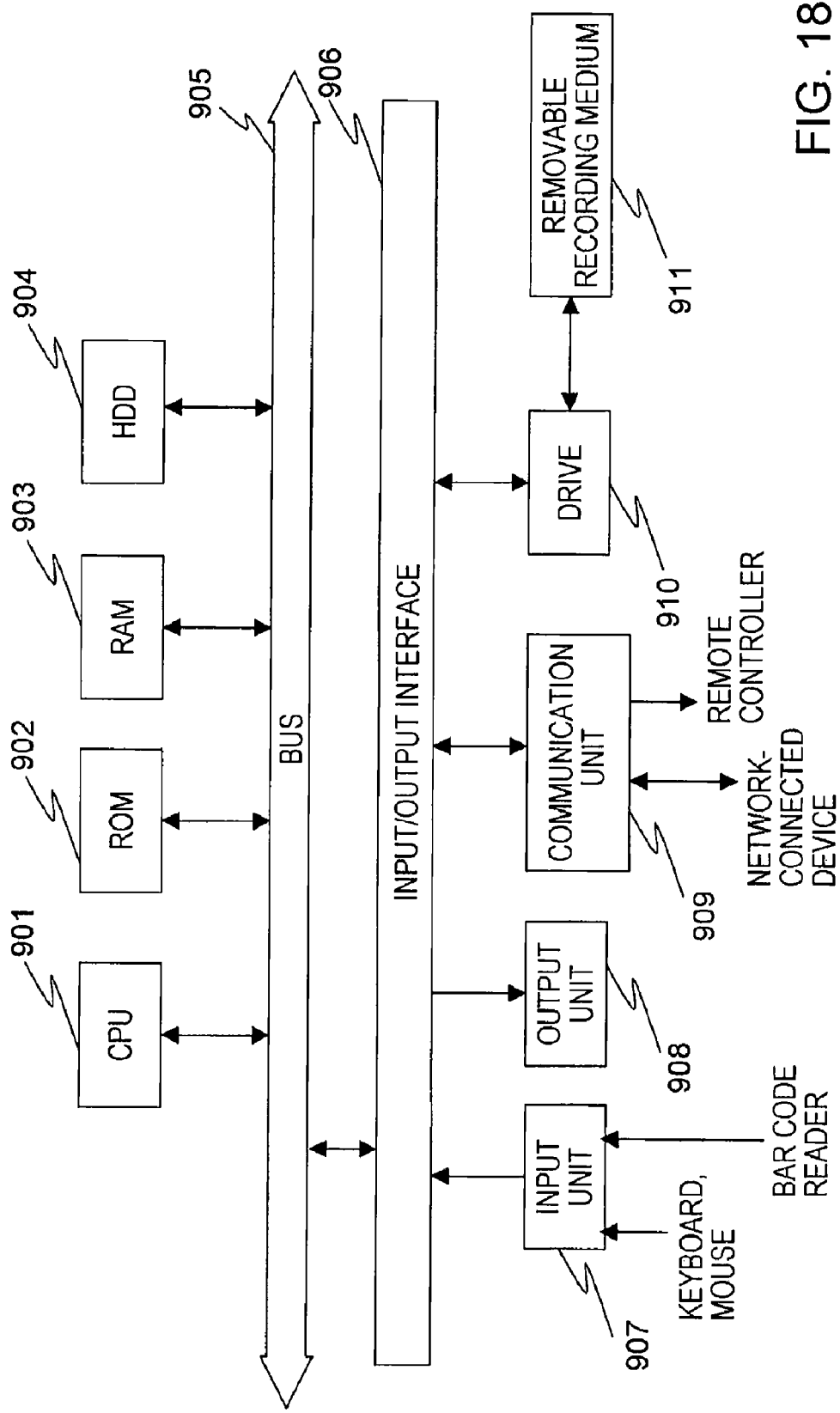
FIG. 18 is a diagram showing an information processing apparatus that can be implemented as a device control processing apparatus and a display control apparatus.

The process for generating device control processing information and outputting it to a remote controller, or the process for generating a content-card-based user interface and presenting it on a display, described above in the aforementioned embodiment, is implemented by, for example, storing a program for executing the above-described process in a PC and causing a CPU in the PC to operate as control means to execute the program. The configuration of the PC as an example hardware configuration for executing the above-described process will be described with reference to FIG. 18.

A CPU (Central Processing Unit) 901 executes various processes according to a program stored in a ROM (Read Only Memory) 902, an HDD 904, or the like, and functions as data processing means or communication control processing means. A RAM 903 stores the program executed by the CPU 901 or data, if necessary. The CPU 901, the ROM 902, the RAM 903, and the HDD 904 are connected to one another via a bus 905.

An input/output interface 906 is connected to the bus 905. An input unit 907 for processing input information from, for example, a keyboard, a mouse, or a bar code reader operated by the user, and an output unit 908 including an LCD, a CRT, and a speaker for presenting various types of information to the user are connected to the input/output interface 906. A communication unit 909 functioning as data transmitting/receiving means is also connected. The communication unit 909 communicates with various devices via a home network and the Internet, and also communicates with a remote controller that is cable-connected via, for example, USB. A removable recording medium 911, such as a magnetic disc, an optical disc, a magneto-optical disc, or a semiconductor memory, is also attachable, and a drive 910 for reading or writing data from or to the removable recording medium 911 is connected.

The present disclosure has been in detail described with reference to a specific embodiment. However, it is obvious that modifications and alternatives of the embodiment may be made by those skilled in the art without departing from the scope of the present disclosure. That is, the present disclosure is disclosed in view of an example, and should not be restrictively construed. Reference should be made to the appended claims for delineation of the scope of the present disclosure.

The series of processes described in this document may be executed by hardware, software, or a combination thereof. When the processes are executed by software, a program recording the sequence of processes may be installed into a memory of a computer incorporated in dedicated hardware and may be executed, or the program may be installed into a general-purpose computer capable of executing various processes and may be executed.

For example, the program may be recorded in advance in a recording medium, such as a hard disk or a ROM (Read Only Memory). Alternatively, the program may be temporarily or persistently stored (recorded) in a removable recording medium, such as a flexible disk, a CD-ROM (Compact Disc Read Only Memory), an MO (Magneto optical) disk, a DVD (Digital Versatile Disc), a magnetic disk, or a semiconductor memory. The removable recording medium may be offered as so-called packaged software.

The program may be installed from the removable recording medium described above to a computer, or may be wirelessly transferred from a download site to the computer or transferred to the computer via lines over a network, such as a LAN (Local Area Network) or the Internet. The computer may receive the thus transferred program and may install it into a recording medium, such as a built-in hard disk.

The processes described in this document may be executed in a time-series manner according to the description, or may be executed in parallel or individually depending upon the processing performance of an apparatus executing the processes or according to the necessity. The system in this document is a logical set of a plurality of apparatuses and is not limited to the structure in which these apparatuses are housed in a single housing.

INDUSTRIAL APPLICABILITY

According to a structure of the present disclosure, therefore, content identification information is input, a controlled device is determined from a content-device-correspondence table storing correspondence data between content identification information and content-providing devices based on the input content identification information, and control information corresponding to the determined controlled device is generated and output. Thus, the user can output desired content merely by inputting content specifying information. That is, it is possible to output and view content without performing processing necessary to output the content, such as processing on a controlled device, a channel operation to the controlled device, and searching for the content storage location.

According to a structure in an embodiment of the present disclosure, furthermore, content cards recording content information are configured according to the number of content items, and a card group including a plurality of content cards corresponding to the number of content items is displayed as a card group indicating only the presence of content with the content information being hidden. The content cards are moved on a parametric curve while changing the angle of the content cards depending on the position of, for example, a user-operable cursor so that only the content information of a small number of cards including a card selected by the user is displayed. Thus, the user can understand overall information about the entire content, and can also understand detailed information about the selected content item.

According to a structure in an embodiment of the present disclosure, furthermore, a content card recording content information including content-providing device and location information as code data facilitates acquisition of content based on the code information of the card through transmission and reception of the card.

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention is claimed as follows:

1. A display processing apparatus for performing a process for displaying content information that is classified into genres, the display processing apparatus comprising:
   at least one processor;
   at least one memory device storing a plurality of instructions, which when executed by the at least one processor, cause the at least one processor to:
   generate display information for a plurality of content cards, the display information for displaying:
   (a) some of a group of to-be-displayed cards describing content information corresponding to each of a plurality of content items as a group of content information non-display cards indicating only that the cards are present, which are tilted by a large angle so that content information is not displayed;
   (b) a selected content card selected by using a user-operable selection indicator in a portion adjacent to the group of content information non-display cards as a content information display card that is tilted by a small angle so that content information is displayed;
   (c) identification information about a genre corresponding to content information to be displayed,
   (d) the content cards moving in accordance with a user operation for moving the selection indicator, wherein a same tilt angle of content cards among the group of to-be-displayed cards positioned away from the selected content card by an amount greater than a predetermined threshold is maintained while the content cards move until the predetermined threshold is reached, set tilt angles of the content cards by which the content cards are to be tilted in such a manner that a tilt angle of a content card among the group of to-be-displayed cards, which is positioned away from the selected content card by an amount less than the predetermined threshold, is sequentially increased, and wherein content cards that are positioned away from the selected content card by an amount greater than the predetermined threshold are included in the group of content information non-display cards indicating only that the cards are present.

2. The display processing apparatus according to claim 1, wherein the display information is for displaying the content cards moving along a parametric curve in accordance with a user operation for moving the selection indicator, and the display information is for displaying a plurality of content cards including the selected content card at a plurality of positions on a parametric curve extending to the portion adjacent to the group of content information non-display cards in such a manner that the content cards are tilted by a small angle so that content information is displayed.

3. A display processing method for performing a process for displaying a plurality of content cards and content information that is classified into genres, the display processing method comprising:

displaying some of a group of to-be-displayed cards describing content information corresponding to each of a plurality of content items as a group of content information non-display cards indicating only that the cards are present, which are tilted by a large angle so that content information is not displayed;

displaying a selected content card selected by using a user-operable selection indicator in a portion adjacent to the group of content information non-display cards as a content information display card that is tilted by a small angle so that content information is displayed;

displaying identification information about a genre corresponding to content information to be displayed;

moving the content cards in accordance with a user operation for moving the selection indicator, wherein a same tilt angle of content cards among the group of to-be-displayed cards positioned away from the selected content card by an amount greater than a predetermined threshold is maintained while the content cards move until the predetermined threshold is reached; and setting tilt angles of the content cards by which the content cards are to be tilted in such a manner that a tilt angle of a content card among the group of to-be-displayed cards, which is positioned away from the selected content card by an amount less than the predetermined threshold, is sequentially increased, and wherein content cards that are positioned away from the selected content card by an amount greater than the predetermined threshold are included in the group of content information non-display cards indicating only that the cards are present.

4. The display processing method according to claim 3, wherein the display processing method performs a process for moving and displaying the content cards along a parametric curve in accordance with a user operation for moving the selection indicator, and displaying a plurality of content cards including the selected content card at a plurality of positions on a parametric curve extending to the portion adjacent to the group of content information non-display cards in such a manner that the content cards are tilted by a small angle so that content information is displayed.

5. A non-transitory computer readable storage medium storing a computer program for performing a process for displaying a plurality of content cards and content information that is classified into genres, the computer program causing an apparatus to perform:

displaying step of displaying some of a group of to-be-displayed cards describing content information corresponding to each of a plurality of content items as a group of content information non-display cards indicating only that the cards are present, which are tilted by a large angle so that content information is not displayed, and displaying a selected content card selected by using a user-operable selection indicator in a portion adjacent to the group of content information non-display cards as a content information display card that is tilted by a small angle so that content information is displayed;

displaying identification information about a genre corresponding to content information to be displayed;

moving the content cards in accordance with a user operation for moving the selection indicator, wherein a same tilt angle of content cards among the group of to-be-displayed cards positioned away from the selected content card by an amount greater than a predetermined threshold is maintained while the content cards move until the predetermined threshold is reached; and setting tilt angles of the content cards by which the content cards are to be tilted in such a manner that a tilt angle of a card among the group of to-be-displayed cards, which is positioned away from the selected content card by an amount less than a predetermined threshold, is sequentially increased, and wherein content cards that are positioned away from the selected content card by an amount greater than the predetermined threshold are included in the group of content information non-display cards indicating only that the cards are present.

6. The display processing apparatus according to claim 1, wherein a face of a content card is tilted based on the tilt angle.

7. The display processing apparatus according to claim 1, wherein the display information is for displaying channel information and date-and-time information on a face of the selected content card.

8. The display processing apparatus according to claim 1, wherein the display information is for displaying the content cards moving along a movement curve in accordance with a user operation for moving the selection indicator, the movement curve including a plurality of parametric curves having different parameters.

* * * * *